US012233013B2

(12) United States Patent
Phillips

(10) Patent No.: US 12,233,013 B2
(45) Date of Patent: Feb. 25, 2025

(54) GAIT BELT

(71) Applicant: Michael Phillips, Nampa, ID (US)

(72) Inventor: Michael Phillips, Nampa, ID (US)

( * ) Notice: Subject to any disclaimer, the term of this patent is extended or adjusted under 35 U.S.C. 154(b) by 772 days.

(21) Appl. No.: 17/322,628

(22) Filed: May 17, 2021

(65) Prior Publication Data

US 2021/0267829 A1 Sep. 2, 2021

Related U.S. Application Data

(63) Continuation-in-part of application No. 16/010,257, filed on Jun. 15, 2018, now abandoned.

(60) Provisional application No. 62/520,016, filed on Jun. 15, 2017.

(51) Int. Cl.
*A61G 7/10* (2006.01)

(52) U.S. Cl.
CPC ......... *A61G 7/1038* (2013.01); *A61G 7/1051* (2013.01)

(58) Field of Classification Search
CPC .. A61G 7/1023; A61G 7/1038; A61G 7/1051; A61G 7/10
See application file for complete search history.

(56) References Cited

U.S. PATENT DOCUMENTS

| | | | |
|---|---|---|---|
| 3,236,234 A | 2/1966 | Buckley | |
| 3,290,083 A * | 12/1966 | Norton | B66C 1/18 294/74 |
| 3,368,837 A * | 2/1968 | Norton | B66C 1/18 294/74 |
| RE26,704 E * | 11/1969 | Norton | B66C 1/18 294/74 |
| 3,757,893 A | 9/1973 | Hobbs | |
| 5,688,011 A * | 11/1997 | Gulley | B66C 1/18 294/74 |
| 6,073,280 A | 6/2000 | Farnum | |
| 6,175,973 B1 | 1/2001 | Hakamiun | |
| 6,449,785 B1 | 9/2002 | Liljedahl | |
| 6,671,899 B1 * | 1/2004 | Oja | A61G 7/1023 5/89.1 |
| 6,908,131 B2 | 6/2005 | Main | |
| 8,321,972 B1 | 12/2012 | Vetter | |
| 8,333,262 B1 | 12/2012 | Carpenter | |
| 8,607,378 B2 | 12/2013 | Moriarity | |
| 9,271,889 B2 | 3/2016 | Binder | |
| 2007/0048554 A1 * | 3/2007 | Jacobs | B66C 1/12 428/920 |
| 2009/0178194 A1 * | 7/2009 | Story | A61G 7/1023 5/81.1 R |
| 2013/0254987 A1 | 10/2013 | Brannstrom | |

* cited by examiner

*Primary Examiner* — Justin C Mikowski
*Assistant Examiner* — Ifeolu A Adeboyejo

(57) ABSTRACT

A gait belt for lifting and transferring patients including a generally elongated, wide belt body with two free ends, a belt strap connected to the belt body to secure the belt to the patient's waist, belt strap extensions configurable as both a belt body closure and as thigh supports, and multiple lifting handles affixed to the belt.

19 Claims, 7 Drawing Sheets

GAIT BELT

CROSS REFERENCE TO RELATED APPLICATIONS

This application is a continuation in part of U.S. Non-provisional application Ser. No. 16/010,257 filed Jun. 15, 2018 which claims priority to U.S. Provisional Application Ser. No. 62/520,016 filed Jun. 15, 2017, which are incorporated herein in their entirety.

FIELD OF INVENTION

This invention generally relates to gait belts for use in lifting, transferring, positioning or ambulating patients.

BACKGROUND OF THE INVENTION

Gait belts are commonly used for lifting or transferring patients from one position to another. A typical gait belt includes a two-inch wide web belt with a simple buckle. Use of a typical gait belt can cause pain in many heavier patients as the belt "cuts into" them upon lifting. Typical gait belts also tend to slide up from the waist area of many "pyramid" or "pear"-shaped patients. The result is that the gait belt slides up under the armpits and becomes reliant upon the structure and muscle tone of the patient's shoulder girdle to accept the force of the lifting effort. Many patients cannot bear the amount of strain and pressure on the shoulder girdle necessary to lift them. Shoulder injuries, age or musculo-skeletal illnesses are often the limiting factors with a significant number of the patients and can preclude use of shoulder girdles as an acceptable purchase point for lifting. Additionally, for a care provider, the higher "grip" on the patient often means that the final phase of a "lift to standing position" maneuver ends up with the lifter attempting to lift at a much higher point at or near the shoulder level. This can result in strained neck and shoulder muscles or injuries on the part of the care provider. Accordingly, improvements are sought in both comfort and support for the patient, as well as safety for the care provider during lifting with a gait belt.

SUMMARY OF THE INVENTION

While the way that the present invention addresses the disadvantages of the prior art will be discussed in greater detail below, in general, the present invention provides a gait belt having a generally elongated belt body with two free end portions; a belt strap/central webbing to secure the belt body around the waist of the wearer; and a plurality of lifting handles; wherein the said gait belt can be employed in a number of configurations in various methods for lifting a patient.

According to one aspect of the invention features, a gait belt is provided, including a wide elongated belt body having a longitudinal axis, an outer face, an inner face and two opposed free end portions, wherein the wide elongated belt body is configured to at least partially encircle a wearer's waist; a belt strap/central webbing connected to the wide elongated belt body, configured to adjustably secure the wide elongated belt body in relation to the wearer's waist; and a plurality of lifting handles affixed to the belt body in varying circumferentially-spaced relation and orientation to one another to optimize safe care provider positioning and modalities of patient movement.

In an alternative embodiment, the gait belt further comprises a flexible thigh supporting system configured to support the legs/thighs of a wearer. In some embodiments, the thigh supporting system comprises leg slings formed from extensions of the gait belt.

In various embodiments of the present invention, the gait belt further comprises a perimeter webbing, a vertical webbing and a combination of buckle closures provided on the belt strap/central webbing, allowing adjustable securement of the gait belt with respect to patient's body.

In various embodiments of the present invention, the plurality of handles are disposed along the outer face of the wide elongated belt body, with some of the handles positioned substantially parallel to the longitudinal axis of the belt body and others positioned substantially perpendicular to the longitudinal axis of the belt body. Preferably, the parallel positioned handles are affixed to belt strap/central webbing running along the length of the belt body and the perpendicularly positioned handles are affixed to perimeter webbing extending along the margins of the belt body. In preferred embodiments of the present invention, at least one perpendicularly positioned handle is configured to also act as a wrist loop for the care giver, affixed to at least one of the free end portions of the belt body, configured for lifting.

In preferred embodiments of the present invention, the belt strap/central webbing extends beyond the length of the belt body and includes buckle/closure halves at each end thereof. The buckle/closure halves presented at each end of the central webbing/belt strap and the respective belt strap/central webbing extensions are complementary to one another and allow for formation of an intermediate closed loop or a larger closed loop with the belt body, or smaller loops at respective ends of the central webbing and belt body. The smaller loops can be configured to serve as leg supports, wrist straps, or lifting handles.

In preferred embodiments of the present invention, the belt strap/central webbing, belt strap/central webbing extensions and plurality of parallel disposed handles are made from a single continuous piece of a flexible material. In some embodiments of the present invention, the belt strap/central webbing, belt strap/central webbing extensions and plurality of handles are made using discrete pieces of a flexible material. In some embodiments, the belt strap/central webbing extensions are discrete constructions while the belt strap/central webbing and the plurality of handles are made using the single continuous piece of flexible material.

According to another aspect of the invention features, a method for lifting and transferring a patient is disclosed, comprising steps of positioning a gait belt around a patient's waist, the gait belt comprising a wide elongated belt body having a longitudinal axis and two opposed free end portions, wherein the belt body is configured to at least partially encircle a wearer's waist; a belt strap/central webbing connected to the elongated belt body, configured to adjustably secure the belt body in relation to the wearer's waist; and, a plurality of lifting handles affixed to the belt body in circumferentially-spaced relation to one another; securing the belt strap in tight but comfortable relation to the patient's waist; and, applying upward force to at least two lifting handles. In some embodiments of the present invention, a modification of the method is disclosed that further comprises a step of supporting the thighs of the patient by forming smaller loops using the belt strap/central webbing extensions with the belt body, thus acting as a wide gait belt with a self-tightening, supporting leg harness. In some embodiments, the gait belt serves as a lifting sling.

Another aspect of the invention features, in some embodiments, a method for maneuvering a patient using a gait belt.

The method includes positioning a gait belt around a patient's waist, the gait belt comprising a belt body having a central axis, a generally elongated configuration, and two opposed free end portions, the belt body configured to at least partially encircle a patient's waist; a belt strap connected to the belt body, configured to adjustably secure the belt body in relation to the patient's waist; first and second belt strap extensions with closure halves complementary to the respective closure halves of the belt strap; and, a plurality of lifting handles affixed to the belt body in circumferentially-spaced relation to one another. The method further includes threading first and second belt strap extensions under respective legs/thighs of the patient and then back up to the front of the belt body; lacing each of the said belt strap extensions through its at least one of the respective/same-side handles; bucking together the complementary closure halves of the said first and second belt strap extensions to form leg/thigh support loops, and wherein the maneuvering comprises assisting, lifting and/or transferring the patient.

In some embodiments, the belt strap adjustably securing closure mechanism comprising at least one of the fasteners selected from the group of buckles, latches, hooks, loops, snaps, adhesives, cohesives, magnets, hermaphroditic fasteners, touch fasteners, interlocking projections and receptacles fasteners, or any combination thereof.

Another aspect of the invention features, in some embodiments, a method for maneuvering a patient using a gait belt. The method includes positioning a gait belt around a patient's waist, the gait belt comprising a belt body having a central axis, a generally elongated configuration, and two opposed free end portions, the belt body configured to at least partially encircle a patient's waist; a belt strap connected to the belt body, configured to adjustably secure the belt body in relation to the patient's waist; first and second belt strap extensions with closure halves complementary to the respective closure halves of the belt strap; and, a plurality of lifting handles affixed to the belt body in circumferentially-spaced relation to one another. The method further includes threading first and second belt strap extensions under respective legs/thighs of the patient and then back up to the front of the belt body; optionally, lacing each of the said belt strap extensions through their respective handles; buckling each of the said belt strap extension complementary closure halves to its respective complementary closure half provided on the belt strap to form two independent leg/thigh support loops, and wherein the maneuvering comprises assisting, lifting and/or transferring the patient.

In some embodiments, the belt strap adjustably securing closure mechanism comprising at least one of the fasteners selected from the group of buckles, latches, hooks, loops, snaps, adhesives, cohesives, magnets, hermaphroditic fasteners, touch fasteners, interlocking projections and receptacles fasteners, or any combination thereof.

Another aspect of the invention features, in some embodiments, a method for lifting and transferring a patient using a gait belt, including positioning a gait belt around a patient's waist, the gait belt comprising a belt body having a central axis, a generally elongated configuration, and two opposed free end portions, the belt body configured to at least partially encircle a patient's waist; a belt strap connected to the belt body, configured to adjustably secure the belt body in relation to the patient's waist; and, a plurality of lifting handles affixed to the belt body in circumferentially-spaced relation to one another; securing the belt strap in relation to the patient's waist; applying upward force to at least one of the lifting handles; and supporting the thighs of the patient with a flexible extension of the belt strap.

Another aspect of the invention features, in some embodiments, a method for maneuvering a patient using a gait belt is discussed. The method includes positioning a gait belt around a patient's waist, the gait belt comprising a belt body having a central axis, a generally elongated configuration, and two opposed free end portions; a belt strap connected to the belt body having complementary closure halves; first and second belt strap extensions with closure halves complementary to the respective closure halves of the belt strap; and, a plurality of lifting handles affixed to the belt body in circumferentially-spaced relation to one another; threading first and second belt strap extensions under the respective legs/thighs of the patient and then back up to the front of the belt body; lacing at least one of the said belt strap extensions through at least one of the said handles; bucking together the complementary closure halves of the said first and second belt strap extensions to form leg/thigh support loops, wherein the maneuvering comprises assisting, lifting, ambulating and/or transferring the patient.

In some embodiments, the belt body is configured to at least partially encircle a patient's waist. In some embodiments, the belt strap is configured to adjustably secure the belt body in relation to the patient's waist with complementary halves of a closure.

In some embodiments, the belt strap adjustably securing closure mechanism comprising at least one of the fasteners selected from the group of buckles, clips, clasps, latches, hooks, loops, snaps, adhesives, cohesives, hook-and-loop fasteners, magnets, hermaphroditic fasteners, touch fasteners, interlocking projections and receptacles fasteners, or any combination thereof.

In some embodiments, both the first and second extensions are laced through a same handle. In some embodiments, the first and second belt extensions are laced through different handles. In some embodiments, the first and second belt extensions are buckled together in front of the patient's body after lacing each belt strap extension through at least one handle.

Another aspect of the invention features, in some embodiments, a method for maneuvering a patient using a gait belt is discussed. The method includes positioning a gait belt around a patient's waist, the gait belt comprising a belt body having a central axis, a generally elongated configuration, and two opposed free end portions, the belt body configured to at least partially encircle a patient's waist; a belt strap connected to the belt body, configured to adjustably secure the belt body in relation to the patient's waist; first and second belt strap extensions with closure halves complementary to the respective closure halves of the belt strap; and, a plurality of lifting handles affixed to the belt body in circumferentially-spaced relation to one another; buckling together the complementary closure halves of the said first and second belt strap extensions in front of patient's body to form a loop, wherein the maneuvering comprises assisting, lifting and/or transferring the patient.

In some embodiments, the belt strap adjustably securing closure mechanism comprising at least one of the fasteners selected from the group of buckles, clips, clasps, latches, hooks, loops, snaps, adhesives, cohesives, hook-and-loop fasteners, magnets, hermaphroditic fasteners, touch fasteners, interlocking projections and receptacles fasteners, or any combination thereof.

In some embodiments, the at least one of the said first and second belt strap extensions are laced through at least one of the said handles before buckling them together.

In some embodiments, neither of the first and second belt strap extensions are laced through any of the handles before buckling them together.

Another aspect of the invention features, in some embodiments, a method for maneuvering a patient using a gait belt is discussed. The method includes positioning a gait belt against a portion of patient's body, the gait belt comprising a belt body having a central axis, a generally elongated configuration, and two opposed free end portions; a belt strap connected to the belt body having complementary closure halves; first and second belt strap extensions with closure halves complementary to the respective closure halves of the belt strap; and, a plurality of lifting handles affixed to the belt body in circumferentially-spaced relation to one another; threading first and second belt strap extensions under or above the respective legs/thighs of the patient; optionally, lacing each of the said belt strap extensions through its at least one of the handles; buckling each of the said belt strap extension complementary closure halves to its respective complementary closure half provided on the belt strap to form two independent leg/thigh support loops, wherein the maneuvering comprises assisting, lifting and/or transferring the patient.

In some embodiments, the gait belt is positioned against the patient's waist. In some embodiments, the belt body is configured to at least partially encircle a patient's waist. In some embodiments, the belt strap is configured to adjustably secure the belt body in relation to the patient's waist with complementary halves of a closure.

In some embodiments, the belt strap adjustably securing closure mechanism comprising at least one of the fasteners selected from the group of buckles, clips, clasps, latches, hooks, loops, snaps, adhesives, cohesives, hook-and-loop fasteners, magnets, hermaphroditic fasteners, touch fasteners, interlocking projections and receptacles fasteners, or any combination thereof.

In some embodiments, the gait belt is positioned underneath the patient's buttocks. In some embodiments, the gait belt is positioned under the patient's thighs.

In some embodiments, the first and second extensions are laced over the patient's thighs and through a same handle to form a leg harness. In some embodiments, the first and second belt extensions are laced over the patient's thighs and through different handles to form a leg harness. In some embodiments, the first and second belt extensions are buckled together in front of the patient's body after lacing each belt strap extension through at least one handle.

The present invention contemplates various mechanisms for lifting and transferring patients, described hereinafter.

In some embodiments, the gait belt is positioned around the patient's waist, hips or chest with one opposed free end of the device passed through the handle of the other opposed free end to form a girth hitch around the patient's body to form a drag assist device. The method further includes lacing the belt strap extension through the opposing handle; and buckling the belt strap extension to its respective complementary closure half provided on the belt strap. In this configuration, a loop is formed by passing the belt around the girth of a patient and through a handle at the end of the belt to form a girth hitch. In this configuration, the gait belt may serve as a drag assist device by providing both a girth hitch and substantive, long belt body for one or multiple emergency responders to grasp handles along the belt length to drag the patient to safety. This configuration may provide a safer alternative to carrying an incapacitated patient.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

DETAILED DESCRIPTION

Figure 1A:
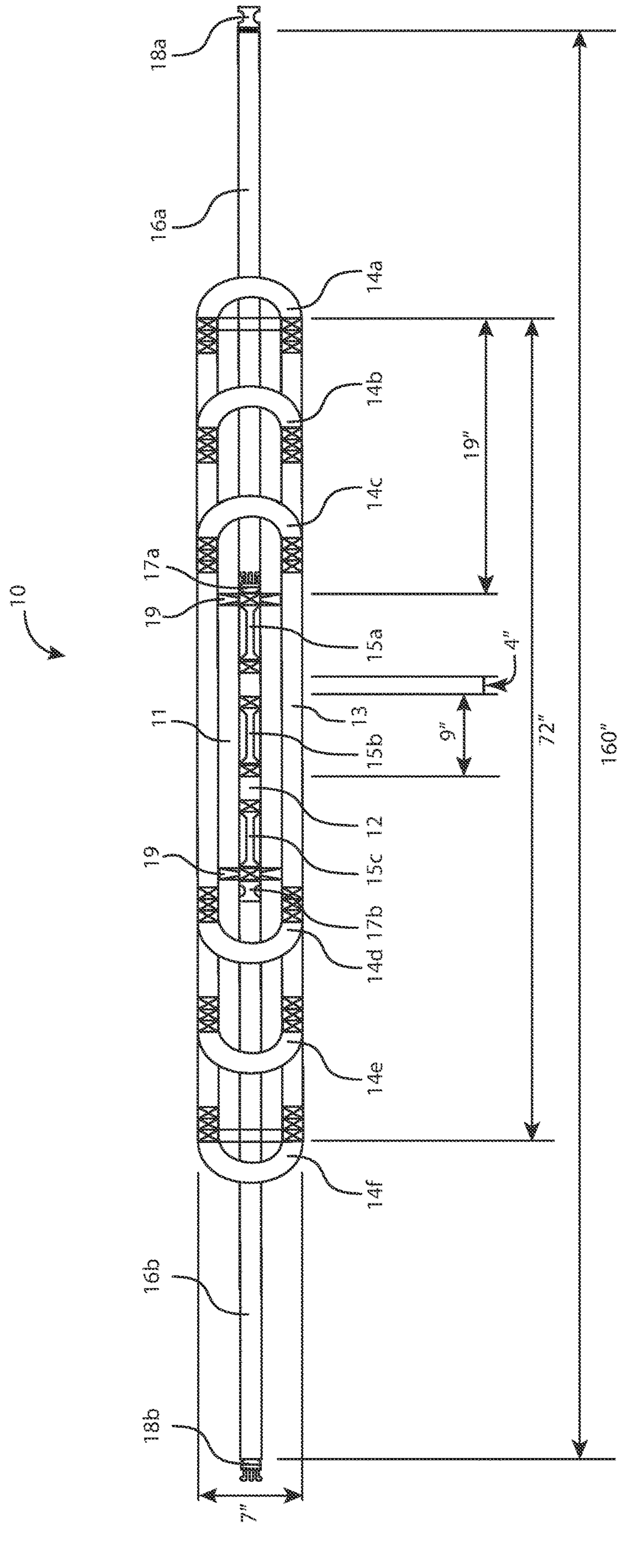
FIG. 1A illustrates a pictorial representation showing a gait belt according to one embodiment of the present invention.

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, mechanisms and the like and still fall within the scope of the present invention. Thus, the detailed description herein is presented for purposes of illustration only and not of limitation. Also, same reference numbers will be used to refer to the same or similar parts throughout the drawings.

Reference in the specification to "one embodiment", "some embodiments", "preferred embodiment", "another embodiment" or "alternative embodiment" is intended to indicate that a particular feature, structure, or characteristic described in connection with the embodiment is included in at least an embodiment of the invention. The appearances of the phrase "one embodiment", "some embodiments", "preferred embodiment", "another embodiment" or "alternative embodiment" in various places in the specification are not necessarily all referring to the same embodiment.

As a general overview, a gait belt is provided, comprising an elongated belt body with two free end portions. The elongated belt body further includes a belt strap/central webbing, a perimeter webbing and a plurality of handles. The gait belt may be used by a care provider to assist in lifting a patient to a standing position.

In accordance with one preferred embodiment of the present invention, a gait belt is provided, comprising a wide elongated belt body with two free end portions. The elongated belt body further includes a belt strap/central webbing, a perimeter webbing and a plurality of handles. The elongated belt body further includes at least one belt strap/central webbing extension extending outwardly along the central axis/longitudinal axis from any of the sides of the belt strap/central webbing, Preferably, the elongated belt body includes two belt strap/central webbing extensions extending outwardly along the central axis/longitudinal axis, one from each side of the belt strap/central webbing.

In an alternative embodiment of the present invention, a gait belt is provided. The gait belt may be used by a care provider to assist in lifting a patient to a standing position. The gait belt comprises an elongated belt body with two free end portions. The elongated belt body further includes a belt strap/central webbing with two distal ends, configured to adjustably secure the elongated belt body in relation to the wearer's waist; a flexible thigh support system, a perimeter webbing and a plurality of handles. The flexible thigh support system includes two dedicated leg/thigh loops, one for each leg/thigh, configured to support the legs/thighs of a wearer during a lifting process. The dedicated leg/thigh loops may be configured to hang independent of each other and are sewn into the elongated belt body at the distal ends of the belt strap/central webbing. It is also possible, however, for the thigh support system to be adjustably attached to the belt body.

Hereinafter, embodiments of the present invention are described in detail with reference to the figures.

Figure 1B:
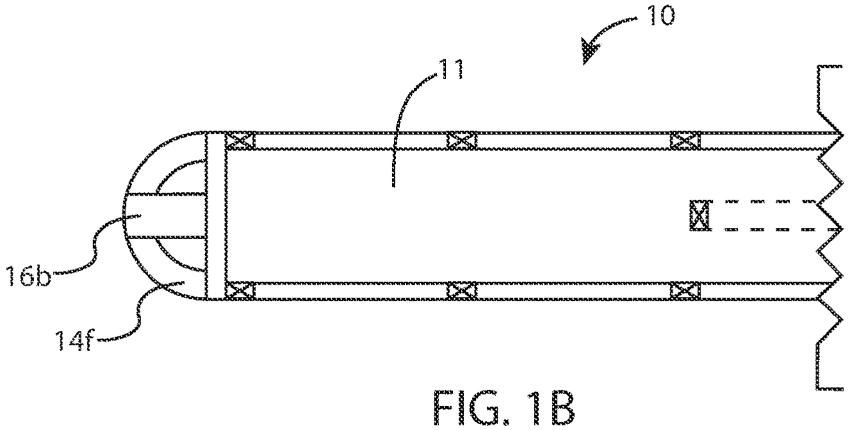
FIG. 1B illustrates an inner face of the gait belt according to one embodiment of the present invention.

FIG. 1A is a pictorial representation showing the outer face of a gait belt designated as 10 according to a preferred embodiment of the present invention. FIG. 1B is a pictorial representation showing the inner face of the gait belt 10. The gait belt 10 comprises an elongated belt body 11 with two free end portions. The elongated belt body 11 further includes a belt strap/central webbing 12, a perimeter webbing 13, a vertical webbing 19 and a plurality of handles 14*a-f* and 15*a-c*. The belt strap 12 preferably has two distal ends. The elongated belt body 11 further includes at least one belt strap/central webbing extension. Preferably, the elongated belt body 11 includes two belt strap/central webbing extensions, depicted as 16*a* and 16*b* in FIG. 1.

Figure 2:
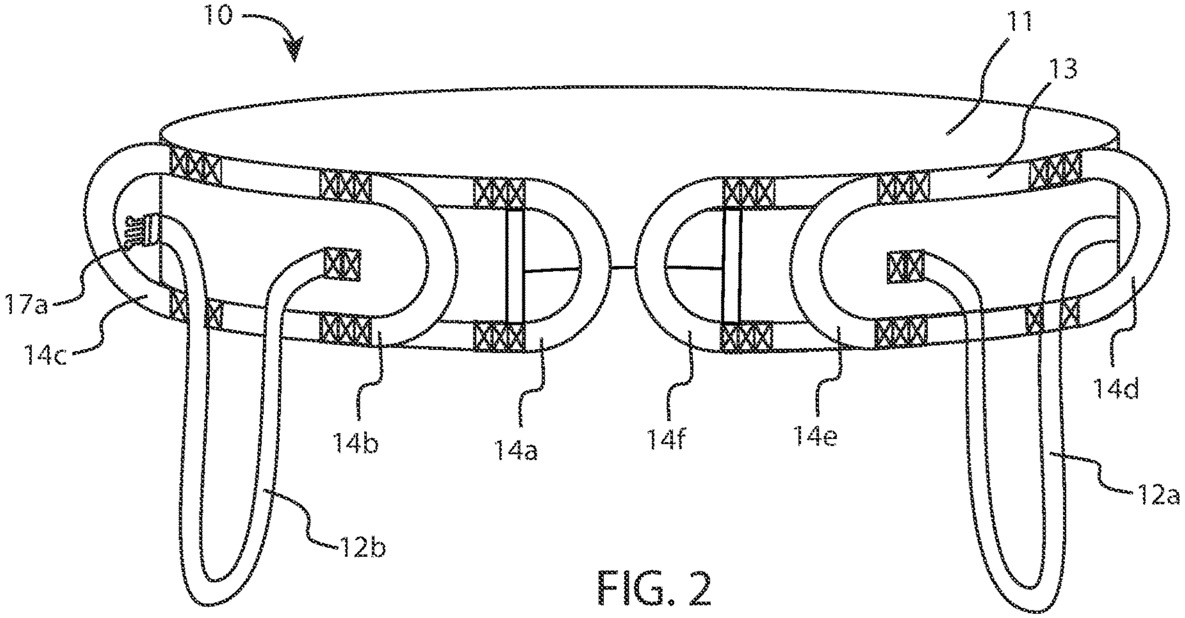
FIG. 2 illustrates a gait belt according to an alternative embodiment of the present invention including a thigh support system.

FIG. 2 illustrates an alternative embodiment of the present invention, a gait belt 10 is provided. The gait belt 10 may be used by a care provider to assist in lifting a patient to a standing position. The gait belt 10 comprises an elongated belt body 11 with two free end portions. The elongated belt body 11 further includes a belt strap/central webbing 12 with two distal ends, a flexible thigh support system, a perimeter webbing 13, a vertical webbing 19 and a plurality of handles 14*a-f* and 15*a-c*. The flexible thigh support system includes two dedicated leg/thigh loops 12*a* and 12*b*, one for each leg/thigh, configured to support the legs/thighs of a wearer during a lifting process. The dedicated leg/thigh loops 12*a* and 12*b* may be configured to hang independent of each other and are sewn onto the elongated belt body 11, preferably at the distal ends of the belt strap/central webbing 12. It is also possible, however, for the thigh support system to be adjustably attached to the belt body 11.

The overall length of the gait belt 10 is of at least 140 inches. Preferably, the gait belt 10 is 150 inches in length, more preferably 160 inches in length. The gait belt 10 of the present invention has been designed to be longer than a typical gait belt in order to accommodate larger than average patients, i.e., those exceeding 72 inches waistline.

Preferably, the gait belt 10 of the present invention is designed to easily fit a 100-inch waistline and can lift weights up to 1200 lbs. or more.

The elongated belt body 11 of the gait belt 10 is adapted to be placed against a portion of a patient, particularly against the lower back region, under the thighs/legs, and/or beneath the buttocks of the patient. The length of the elongated belt body 11 is at least 72 inches. Preferably, the elongated belt body 11 is 82 inches, preferably 92 inches and more preferably 100 inches in length. The overall width of the elongated belt body 11 is at least of 4 inches, preferably 6 inches or more, more preferably at least of 7 inches. This extra wide belt body 11 is advantageous as it does not "cut into" the skin of a patient during a lifting process, spreads the lifting force over a larger body surface area and reduces any discomfort to the patient during a lift process. The wide belt body width increases the contact area with the patient thereby reducing the likelihood of the belt sliding up or out of position on the patient during the lifting process.

In another embodiment, above mentioned dimensions may be modified to fit patients having a waistline 72 inches or below. In this particular embodiment, the elongated belt body 11 having a length of 72 inches or less, 64 inches or less, 56 inches or less and more preferably of 48 inches or less, is contemplated. Also, the overall width of the elongated belt body 11 is at least 4 inches to 7 inches. All individual values and sub-ranges from 4 inches to 7 inches are contemplated herein. Preferably, the width of the elongated belt body 11 is 4 inches.

Any suitable material may be used to form the elongated belt body 11. The suitable materials include durable, flexible materials, for example, but not limited to nylon, polypropylene, canvas, cotton webbing, elastic webbing etc.

In accordance with the preferred embodiments of the present invention, the belt strap 12, belt strap extensions 16*a* and 16*b* and plurality of handles 15*a-c* are made using a single continuous piece of flexible material, described hereinafter. Preferably, the single continuous piece of flexible material can have different widths depending upon the use of the gait belt 10. For example, it can be made 2 or more inches wide, 4 or more inches wide, 6 or more inches wide. Preferably, the width of 2 inches is found to be enough to allow proper and safe use of the gait belt 10.

The single continuous piece of flexible material is configured to form a closed loop. The said closed loop is configured in such a manner it has two distal ends, a top elongate segment and a bottom elongate segment, wherein the said segments are stacked one over the other. The said closed loop is configured to be affixed onto the belt body 11 along its central/longitudinal axis, using multiple points of attachment, preferably using at least four points of attachment. This particular configuration yields at least 5 intermediate loops, wherein among the formed intermediate loops, a) two large loops substantially extend beyond the flanking free end portions of the belt body 11 and form free-hanging belt strap extensions 16*a* and 16*b*, one on each said flanking free end portion of the belt body 11. Each loop has a distal end, a top segment, a bottom segment and a point of attachment affixing the loop to the belt body 11. Each distal end is configured to house a fastening mechanism (18*a*, 18*b*), described in the embodiments hereinafter;

b) one middle loop forms the belt strap 12 and the plurality of handles 15*a-c*. The middle loop has a top segment, a bottom segment and two flanking points of attachment. The bottom segment of the said middle loop forms belt strap 12, which is sewn onto the belt body 11 along its edges in longitudinal direction. The flanking points of attachment of the belt strap 12 form the distal ends of the belt strap 12. The top segment of the said middle loop forms the plurality of handles 15*a-c*. The method to form plurality of handles out of the top segment is described in the embodiments hereinafter; and, c) two small loops, each between an aforementioned large loop and the said middle loop. The small loops are configured to house a fastening mechanism (17*a*, 17*b*), described in the embodiments hereinafter.

The said points of attachment are preferably "X"-box sewing patterns, wherein each "X"-box affixes both the top and bottom segments onto the belt body 11.

In accordance with various embodiments of the present invention, the belt strap 12 only covers a portion of the belt body 11. Particularly, as shown in FIG. 1A, the spacing between a distal end of the belt strap 12 and the nearest free end of the belt body 11 is preferably of 19 inches. However, the said spacing may be varied depending upon the requirement. The belt strap 12 can have different widths depending upon the use of the gait belt 10. For example, the belt strap can be made 2 or more inches wide, 4 or more inches wide, 6 or more inches wide. Preferably, the width of 2 inches is found to be enough to allow proper and safe use of the gait belt 10.

In the various embodiments of the present invention, belt strap fastening mechanisms 17*a* and 17*b* are provided, wherein the said fastening mechanisms 17*a* and 17*b* form a complementary pair. Alternatively, the fastening mechanisms 17*a* and 17*b* may not be in the form of a complementary pair. Any suitable fastening mechanisms may be used, for example but not limited to, clips, clasps, buckles, latches, hooks, loops, snaps, adhesives, cohesives, hook-and-loop fasteners, magnets, hermaphroditic fasteners, touch fasteners, interlocking projections and receptacles fasteners, or any combination of any of these or other fasteners. Preferably, the belt strap fastening mechanisms 17*a* and 17*b* are a pair of complementary buckles, i.e., one of the buckles is a male buckle and the other a female buckle. The belt strap buckles 17*a* and 17*b* used in the present invention are of conventional type rated at minimum of 200 lbs. load. Preferably, the belt strap buckles 17*a* and 17*b* are rated for lifting a weight of 260 lbs. or more, 320 lbs. or more, and more preferably, 380 lbs. or more.

A perimeter webbing 13 is provided on the elongated belt body 11, sewn on both inner and outer faces, along the outer edges of the elongated belt body 11 such that the width of the perimeter webbing 13 on each face of the elongated belt body 11 is at least 0.5 to 1 inch. Preferably the width is of 1 inch on each face of the elongated belt body 11.

Figure 3:
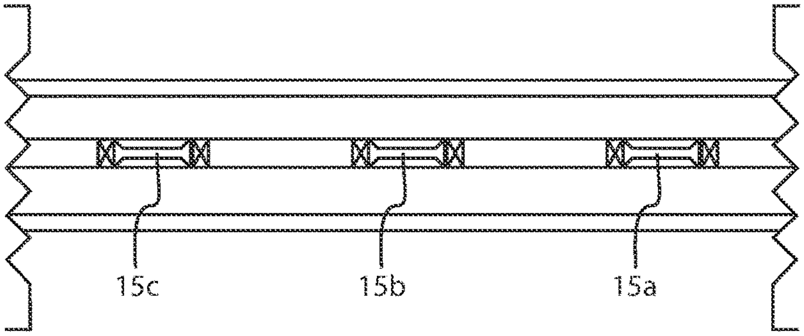
FIG. 3 illustrates a plurality of handles arranged as discrete constructions and parallel to the longitudinal axis of the gait belt according to one embodiment of the present invention.
Figure 3A:
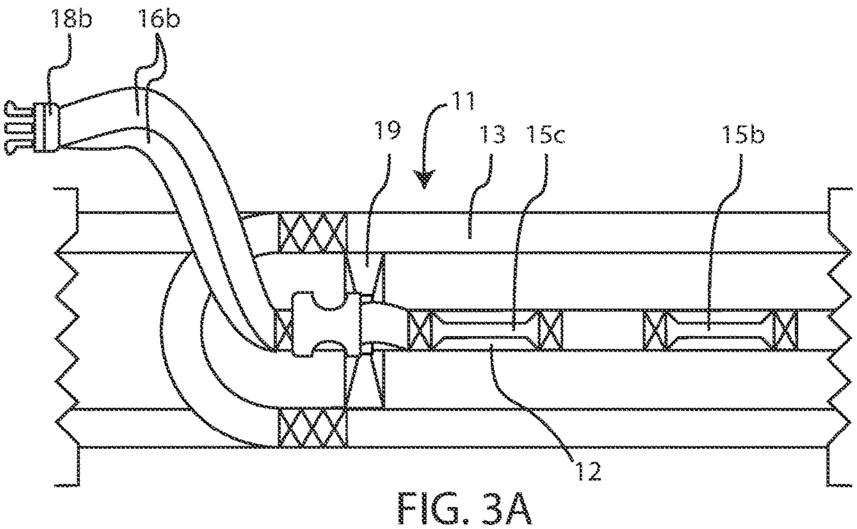
FIG. 3A illustrates a plurality of handles as continuous piece of belt strap/central webbing according to one embodiment of the present invention.

The elongated belt body 11 includes reinforcing vertical webbing 19, sewn at distal ends of the belt strap 12, as shown in FIG. 1 and FIG. 3A. The vertical webbing 19 is sewn vertically from top edge of belt body 11 to bottom edge of belt body 11. The vertical webbing 19 is preferably sewn beneath the belt strap 12 and is sewn into the top and bottom 1-inch perimeter webbing 13 to enhance the structural stability of the gait belt 10 when it is pulled laterally in respect the elongated belt body 11. The vertical webbing 19 also serves to reinforce the point of attachment of the belt extensions 16*a* and 16*b* on the belt body 11. The length of vertical webbing 19 is contemplated to be same as the width of the belt body 11. Also, it is contemplated that the width of the vertical webbing 19 is same as that of belt strap 12 and/or belt strap extensions 16*a* and 16*b*. Preferably, the vertical webbing 19 has a length and width of 7 inches and 2 inches, respectively.

Any suitable material may be used to form belt strap 12, perimeter webbing 13 and vertical webbing 19. Suitable materials include durable, flexible materials, for example but not limited to nylon, polypropylene, canvas, cotton webbing, elastic webbing etc. In accordance with preferred embodiment, the belt strap 12, perimeter webbing 13 and vertical webbing 19, can be made using the same or different materials.

The plurality of handles 14*a-f* and 15*a-c* provided on the elongated belt body 11 are adapted to be grasped by a care provider during a lifting process. The handles provided in the present invention have large enough handle loops such that the said loops can easily accommodate a care provider's forearm. Particularly, the handles provided at the free ends of the elongated belt body 11 are configured to accommodate care provider's forearm and also act as wrist loops. The plurality of handles allows handling of a patient by multiple care providers at once, i.e., the provision of multiple handles enables a lifting process to be executed by 2 or more, 3 or more, 4 or more, 5 or more care providers at once. The present invention is advantageous in a particular sense that it provides various possibilities for the placement of the lifting handles. This enables a multitude of lifting scenarios without the need to have the gait belt placed precisely for handle access. Additionally, the placement of multiple handles on the gait belt provides a care provider with an increased range of lifting height, thereby decreasing the strain applied to the neck, back and shoulders during the final lifting phase.

The handles can be arranged in multiple configurations on the gait belt 10, for example in a parallel and/or a perpendicular configuration and, at multiple locations along the length of the elongated belt body 11. As shown in FIG. 1, the handles 15*a*, 15*b* and 15*c* are configured in an arrangement such that the handles 15*a*, 15*b* and 15*c* are parallel to the longitudinal axis of the elongated belt body 11 and are located over the belt strap 12. In accordance with some embodiments of the present invention, as shown in FIG. 3, each of the said handle is a discrete construction sewn over the belt strap 12 using "X"-box sewing pattern. The preferable spacing between the two consecutive parallel handles is of 4 inches, although the said spacing may be modified depending upon the requirement and total number of handles provided on the belt body 11. Also, the length of each parallel disposed handle is such that a care provider can easily grasp them without any hindrance. The length is preferably of 9 inches. Similarly, the handles 14a, 14b, 14c, 14d, 14e and 14f are configured in an arrangement such that the handles 14a, 14b, 14c, 14d, 14e and 14f are perpendicular to the longitudinal axis of the elongated belt body 11 and are sewn over the perimeter webbing 13 using "X"-box sewing pattern, wherein each of the said handles may have a multiplicity of "X"-boxes to provide enhanced strength. Two of the said handles 14a-f are located at the free end portions of the elongated belt body 11. The arrangement of the perpendicularly arranged handles 14a-f over the outer face of the elongated belt body 11, is clearly shown in FIGS. 4 and 5.

In accordance with preferred embodiments of the present invention, the handles 15a, 15b and 15c are a continuous piece of the belt strap 12 as shown in FIG. 3A. The top segment of the middle loop of the single continuous piece of flexible material (discussed supra) is configured to form a plurality of handles at regular intervals along the longitudinal axis. The top elongate segment is folded (along the longitudinal axis) over itself in such a manner that the 2-inch-wide belt strap 12 folds into 1-inch handle straps, to form handles 15a, 15b and 15c sewn across the back of the belt strap 12 with "X" boxes sewn between them.

In an alternate embodiment of the present invention, the belt strap, belt strap extensions and plurality of parallel handles are made using discrete pieces of a flexible material. In another alternate embodiment, the belt strap extensions are discrete constructions whilst the belt strap and the plurality of parallel handles are made using the single continuous piece of flexible material. In this method of attachment, a single continuous piece of flexible material, preferably 2 inches wide, is affixed to the belt body and is configured to form a closed loop over itself having two opposed distal ends, wherein the so formed closed loop with two opposed distal ends comprises a bottom elongate segment and a top elongate segment. The distal ends of the so formed closed loop are provided with fastening mechanisms. The bottom elongate segment is affixed on the belt body and forms the 2-inch-wide belt strap. The top elongate segment is configured to form the plurality of handles at regular intervals along the central axis. The top elongate segment is folded over itself in such a manner that the 2-inch-wide belt strap folds into 1-inch handle straps, to form parallel disposed handles, sewn across the back of the belt strap with "X" boxes sewn between them.

Any suitable material may be used to form the handles. The suitable materials include durable, rigid or flexible materials, for example, but not limited to, rubberized material, polyethylene, nylon, polypropylene, canvas, cotton webbing, elastic webbing etc. In an embodiment, the handles, particularly handles 15a-c can rubberized luggage handles. In another embodiment, the handles 14a-f and/or handles 15a-c may be formed from same material that is used for belt strap 12.

The pair of belt strap extensions 16a and 16b provided on the elongated belt body 11 act as extension members, extending beyond the distal ends of the belt strap 12 and also substantially extending beyond the free end portions of the elongated belt body 11. As seen in the FIG. 1, at distal end of each of the belt strap extension 16a and 16b, fastening mechanisms 18a and 18b are provided, wherein the said fastening mechanisms 18a and 18b may or may not form a complementary pair. Any suitable fastening mechanisms may be used, for example, but not limited to, clips, clasps, buckles, latches, hooks, loops, snaps, adhesives, cohesives, hook and loop fasteners, magnets, hermaphroditic fasteners, touch fasteners, interlocking projections and receptacles fasteners, or any combination of any of these or other fasteners. Preferably, the fastening mechanisms 18a and 18b are a pair of complementary buckles, i.e., one of the buckle is a male buckle and the other one a female buckle. The belt strap extension buckles 18a and 18b used in the present invention are of conventional type rated at minimum of 200 lbs. load. Preferably, the belt strap extension buckles 18a and 18b are rated for lifting a weight of 260 lbs. or more, 320 lbs. or more, and more preferably, 380 lbs. or more. It is preferable that the belt strap extension buckles 18a and 18b enable a care provider to adjust the tightness and length of the belt strap extensions 16a and 16b, that are used to form loop(s) around the patient's body.

Figure 4:
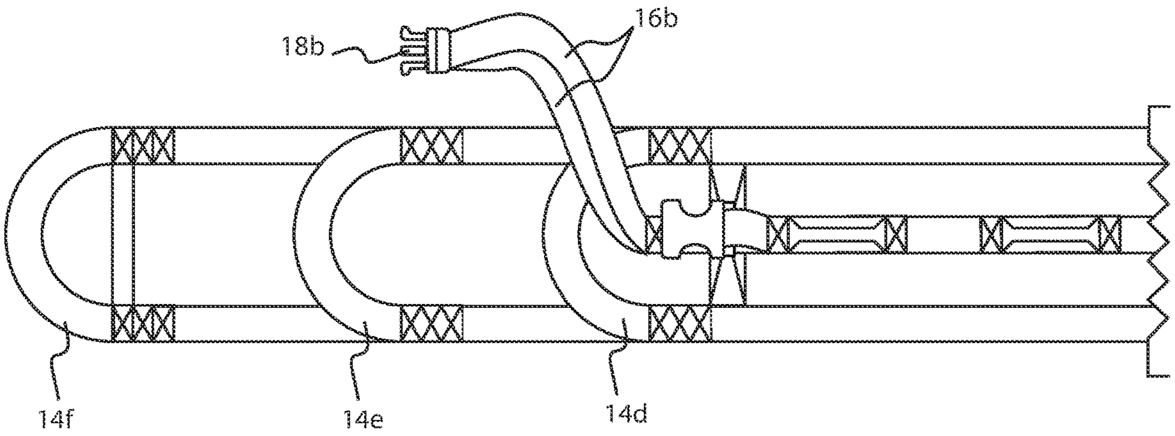
FIG. 4 and FIG. 5 illustrate enlarged portions of the gait belt of FIG. 1.
Figure 5:
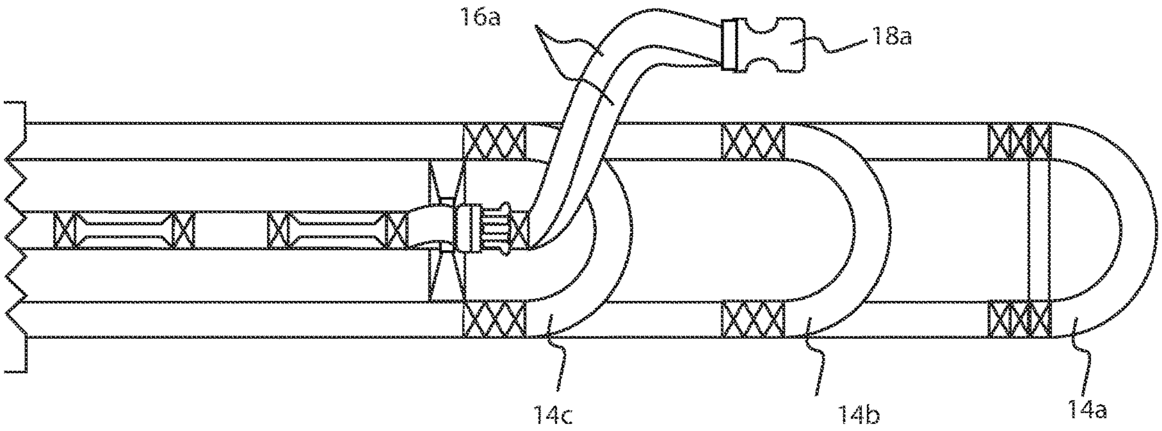

FIG. 4 shows a portion of the gait belt 10 in accordance with preferred embodiment of the present invention. The gait belt 10 comprises elongated belt body 11 including handles 14d, 14e and 14f, belt strap extension 16b, belt strap extension buckle 18b and belt strap buckle 17b. FIG. 5 shows other portion of the gait belt 10 in accordance with preferred embodiment of the present invention. The gait belt 10 comprises elongated belt body 11 including handles 14a, 14b and 14c, belt strap extension 16a, belt strap extension buckle 18a and belt strap buckle 17a.

In some embodiments of the present invention, the belt strap buckle 17a and belt strap extension buckle 18a form a complementary male/female pair. Similarly, the belt strap buckle 17b and belt strap extension buckle 18b form a complementary male/female pair. In some embodiments, it is also contemplated that the belt strap buckles 17a and 17b and belt strap extension buckles 18a and 18b form complementary male/female pairs among themselves. This kind of complementary pairing among the buckles allows to achieve a number of configurations which can be used to perform various lifting processes. It allows for formation of an intermediate closed loop or a larger closed loop with the elongated belt body 11, or smaller loops by clasping buckles at the respective ends of the belt strap 12 and belt strap extensions 16a and 16b. The smaller loops can serve as leg supports, wrist straps or lifting handles.

Hereinafter, in accordance with the preferred embodiments of the present invention, the methods of use of the gait belt 10 and/or various configurations of the gait belt 10 that can be used with various techniques for lifting a patient are described in detail with reference to the figures. It may be noted that the belt strap extensions 16a and 16b of the gait belt 10 comprise top and bottom elongate segments in accordance with the preferred embodiments, however, only one of the segments is depicted in the FIGS. 6-9 for sake of simplicity.

Figure 6:
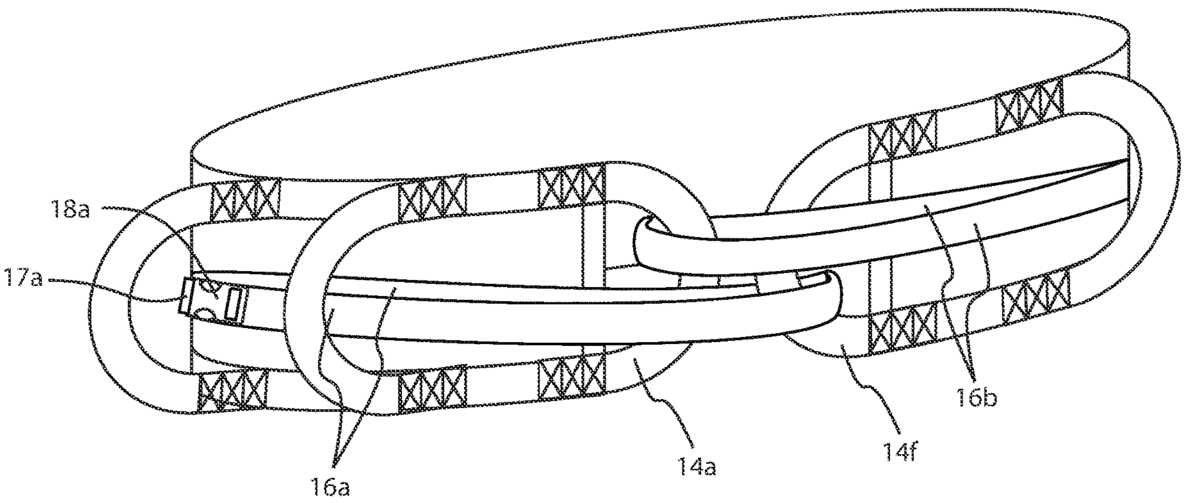
FIG. 6 illustrates a configuration of the gait belt according to one embodiment in which the belt strap extensions loop through distal lifting handles of the elongated belt body and back to respective belt strap buckles to form a large belt body loop closure.

FIG. 6 illustrates an exemplary configuration of the gait belt 10 that can be used in various methods for lifting a patient in accordance with aspects of the present invention. This configuration may be used by a care provider to perform a standard lift, assist and/or transfer of the patient. This configuration is particularly useful for use on seated patients to provide assistance in standing when rising from a seated position. In this configuration, as illustratively shown in FIG. 6, belt strap extension 16a is laced through and over the oppositely located distal handle 14f and then clasped to the belt strap buckle 17a using the belt strap extension buckle 18a to form a closed circular enclosure around the waist of the patient. The top segment of the belt strap extension 16a can be pulled by the care provider(s) to tighten the closure formed around the waist of the patient. A similar closed circular enclosure is formed using the other belt strap extension 16b, by lacing the belt strap extension 16b through and over the oppositely located distal handle

14*a* and clasping the belt strap extension buckle 18*b* (not shown) to the belt strap buckle 17*b* (not shown). The said enclosure can then be tightened by pulling the top segment of the belt strap extension 16*b*. After achieving this configuration, one or more care providers can grab any of the handles provided thereon the gait belt 10 to perform a standard lift, assist and/or transfer. It may be noted that to achieve the above-mentioned configuration, any of the handles 14*a-f* can be employed to form a closed circular enclosure around the waist of the patient. The belt strap extensions optionally may also be laced/passed over and through their respective same-side handles. The choice of handles will largely depend upon the waist size of the patient on whom the lifting process is to be performed. For example, to perform a standard lift, assist and/or transfer procedure on a thinner patient, the care provider may fold back the excess belt body 11 material to expose the handles of choice at the distal ends of the open circular enclosure formed by the belt body 11 around the waist of the patient and use those distally exposed handles to achieve the configuration explained supra.

In another embodiment, the above described configuration may be modified so as to accommodate patients with a waistline larger than that of typical patients. In this particular configuration, after looping the belt strap extensions 16*a* and 16*b* through and around their respective oppositely located distally exposed handles as described in above embodiment, the belt strap extension buckles 18*a* and 18*b* are clasped together in front of the patient, instead of clasping them to their respective belt strap buckles 17*a* and 17*b*, to form a larger closed circular enclosure around the waist of the patient.

Figure 7:
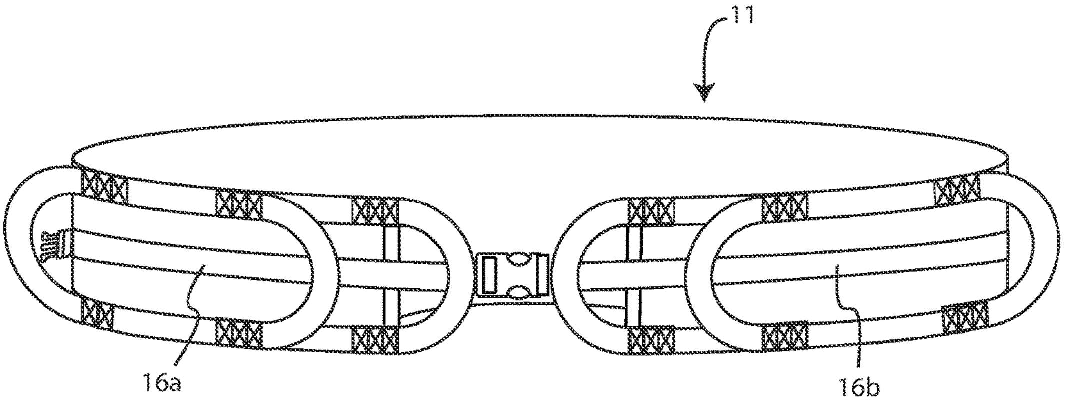
FIG. 7 illustrates a configuration of the gait belt according to one embodiment in which the belt strap extensions are buckled to form a closed belt body loop.

In another embodiment, a modified configuration of gait belt 10, as illustrated in FIG. 7 for performing a standard lift, assist and/or transfer is discussed. This configuration is particularly helpful for use on seated patients to provide assistance in standing when rising from a seated position. In this configuration, the elongated belt body 11 is first placed around the patient's waist at the lower back region. The belt strap extensions 16*a* and 16*b* are then directly bucked together in front of the patient's abdomen after lacing each strap through the handle loops, thus forming a closed circular enclosure around the waist of the patient. The top segments of the belt strap extensions can then be pulled by the care provider to tighten the closure formed around the waist of the patient. After securing this configuration, the care provider can perform a standard lift, assist and/or transfer.

In an alternative embodiment, another configuration of gait belt 10 for performing a standard lift is discussed. This configuration is particularly helpful for use on seated patients to provide assistance in standing when rising from a seated position. Similar to the configuration mentioned in the previous embodiment, the elongated belt body 11 is first placed around and behind the patient's waist at the lower back region. The care provider may then fold back the excess belt body 11 material such that an open circular enclosure is formed around the waist of the patient and the handles of choice are exposed at the distal ends of the open circular enclosure so formed. The choice of handles will depend upon the waist size of the patient on whom the lifting process is to be performed. After choosing and exposing appropriate handles at the distal ends of the open circular enclosure, the care provider shall place himself/herself in front of the patient and grab the exposed handles. Preferably, the care provider should grab the exposed handles using a single hand to ensure a tight closure around the waist of the patient and then perform a standard lift maneuver. More preferably, the care provider should firstly pass his/her hand and a portion of his/her forearm through one of the distally exposed handles and grab neighboring/opposite distally exposed handle with his/her hand, and then rotate his/her forearm across the patient's body, camming over the handle. This maneuver will cause the former distally exposed handle to rest on his/her wrist and thus tightening of the belt around the patient. This type of grip is called a "cam over grip". Then the care provider shall apply a pulling force to perform standard lift maneuver. The care provider may grab one of the parallel handles with his free hand during the lifting process in order to enhance stability of the maneuver.

Figure 8:
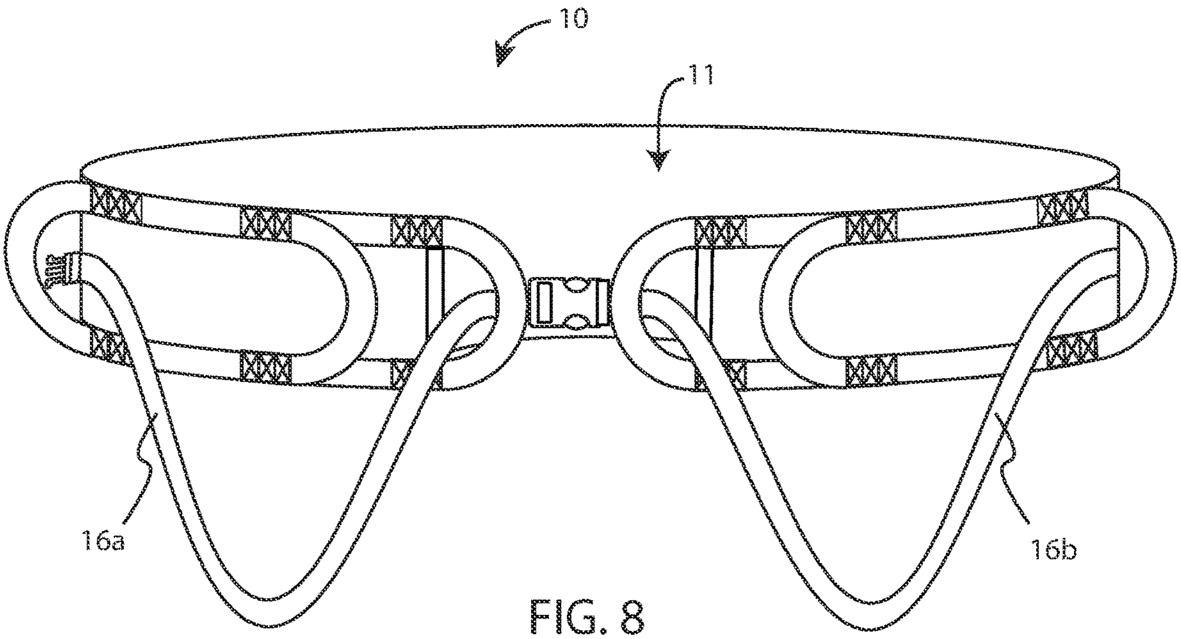
FIG. 8 illustrates a configuration of the gait belt according to one embodiment in which the belt strap extensions buckle together to form respective leg support loops and a large belt body loop closure.
Figure 8A:
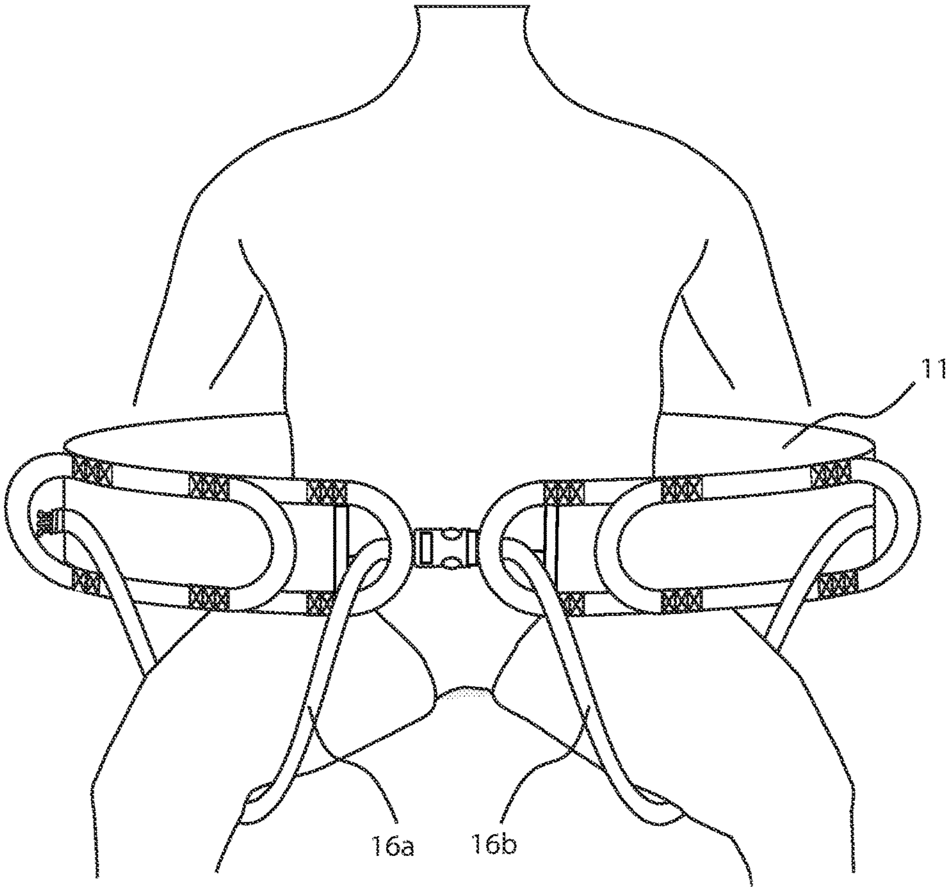
FIG. 8A illustrates the configuration of FIG. 8 worn by a patient.

FIG. 8 and FIG. 8A illustrates another exemplary configuration of the gait belt 10 as a lifting sling, that can be used in various methods for lifting a patient in accordance with aspects of the present invention. This configuration may be useful for use on seated or supine patients to provide assistance in standing after they have fallen or when rising from a seated position. When using the illustrated configuration on supine patients, the care provider may cause the patient to first get into a sitting-up position and then place the elongated belt body 11 behind the lower back of the patient. To achieve the illustrated configuration shown in FIG. 8 and FIG. 8A, each of the belt strap extension 16*a* and 16*b* is firstly threaded under a leg/thigh of the patient and then back up to the front of the elongated belt body 11. The belt strap extensions 16*a* and 16*b* are then laced through the respective/relevant handles and bucked together to form leg/thigh support loops. The top segment of each belt strap extension 16*a* and 16*b* can be pulled by the care provider to form a closed closure around the torso/pelvic region of the patient with a sufficient tightness. After achieving this configuration, one or more care providers can then grab the handles provided thereon the gait belt 10 to perform a lift maneuver. This configuration is particularly advantageous as these leg supports formed by belt strap extensions 16*a* and 16*b* prevent the gait belt 10 from sliding up the patient's torso and transfer some of the lifting force to the patient's legs and buttocks during a lift maneuver.

Figure 8B:
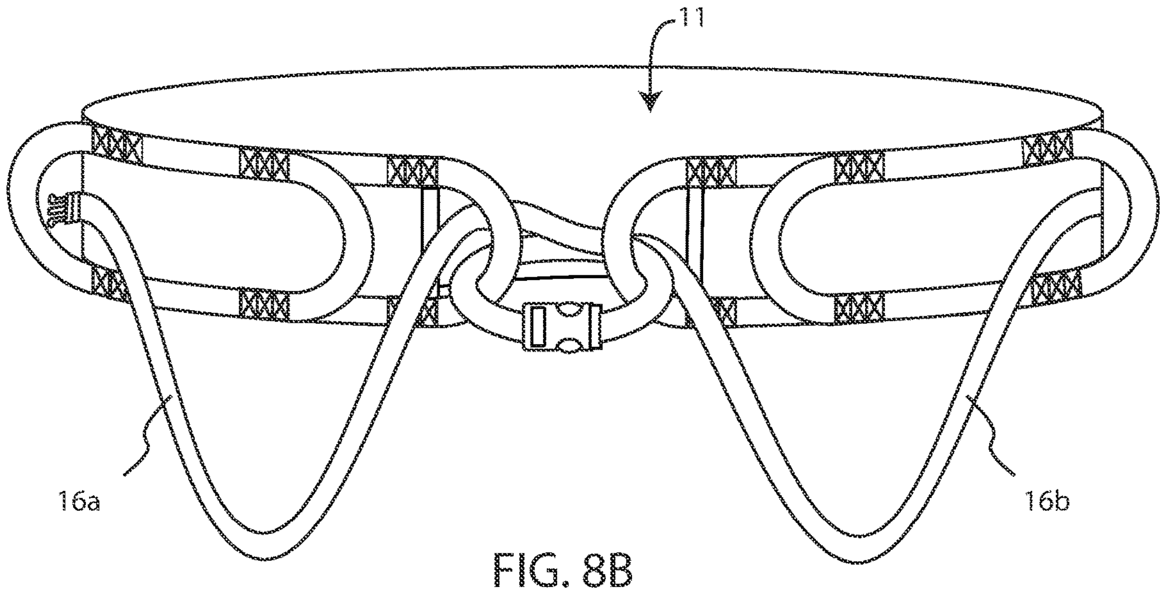
FIG. 8B illustrates an alternative configuration of FIG. 8.

In another embodiment, the above described configuration may be modified to provide a better weight distribution across various components of the gait belt 10. In this modified configuration, after the belt strap extensions 16*a* and 16*b* are threaded under the relevant legs and back up to the front of the elongated belt body 11, the belt strap extensions 16*a* and 16*b* are laced through the respective/relevant handles, then each belt strap extension is laced through and around its oppositely located relevant distal handle and bucked together in front of patient's abdomen/pelvic region to form leg/thigh support loops. The top segment of each belt strap extension 16*a* and 16*b* can be pulled by the care provider to form a closed closure around the torso/pelvic region of the patient with a sufficient tightness. This modified configuration is illustrated in FIG. 8B.

Figure 8C:
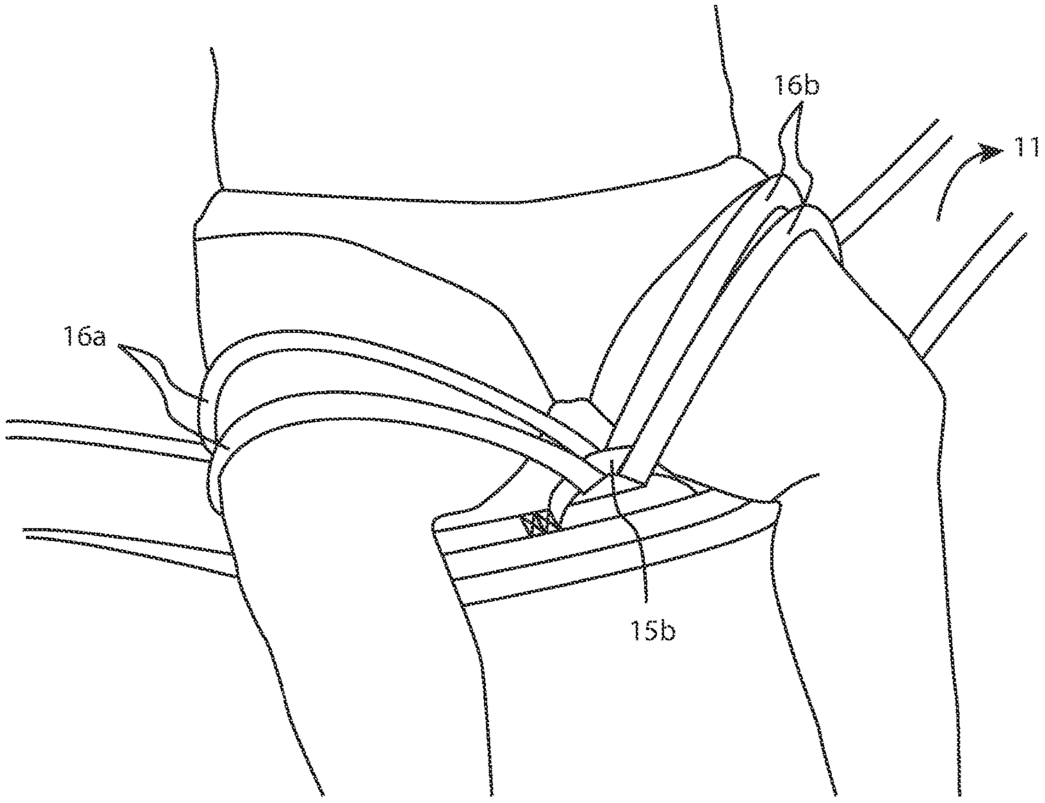
FIG. 8C illustrates an alternative configuration of FIG. 8 according to one embodiment in which the belt strap extensions are clasped to their respective belt strap buckles after passing them over patient's legs/thighs and through the central handle to form respective leg/thigh support loops.

In an alternative embodiment, another configuration of gait belt 10 as a lifting sling is discussed in reference to FIG. 8C. In this configuration, the care provider may not wrap the elongated belt body 11 around the waist of the patient. This configuration may be employed on seated or supine patients to provide assistance in standing after they have fallen or when rising from a seated position. When using the configuration on supine patients, the care provider may cause patient to first get into a sitting-up position. To achieve this configuration, the elongated belt body 11 with its handles facing upwards is placed underneath the thighs of the patient, preferably close to the buttocks such that the central handle 15b gets positioned betwixt the patient's thighs. Each belt strap extension 16a and 16b is passed over a thigh of the patient, i.e., the belt strap extension 16a is passed over one of the thighs and the belt strap extension 16b is passed over the other thigh of the patient, then each belt strap extension 16a and 16b is fed through the central handle 15b and bucked to its respective/same-side belt strap buckles 17a (not shown) and 17b (not shown), thus forming leg/thigh support loops. The top segment of each belt strap extension 16a and 16b can be pulled by the care provider to tighten the resultant loops. After achieving this configuration, the two or more care providers can then grab the handles provided thereon the gait belt 10 to perform lift maneuver by applying an upward lifting force in a forward arcing motion.

Figure 9:
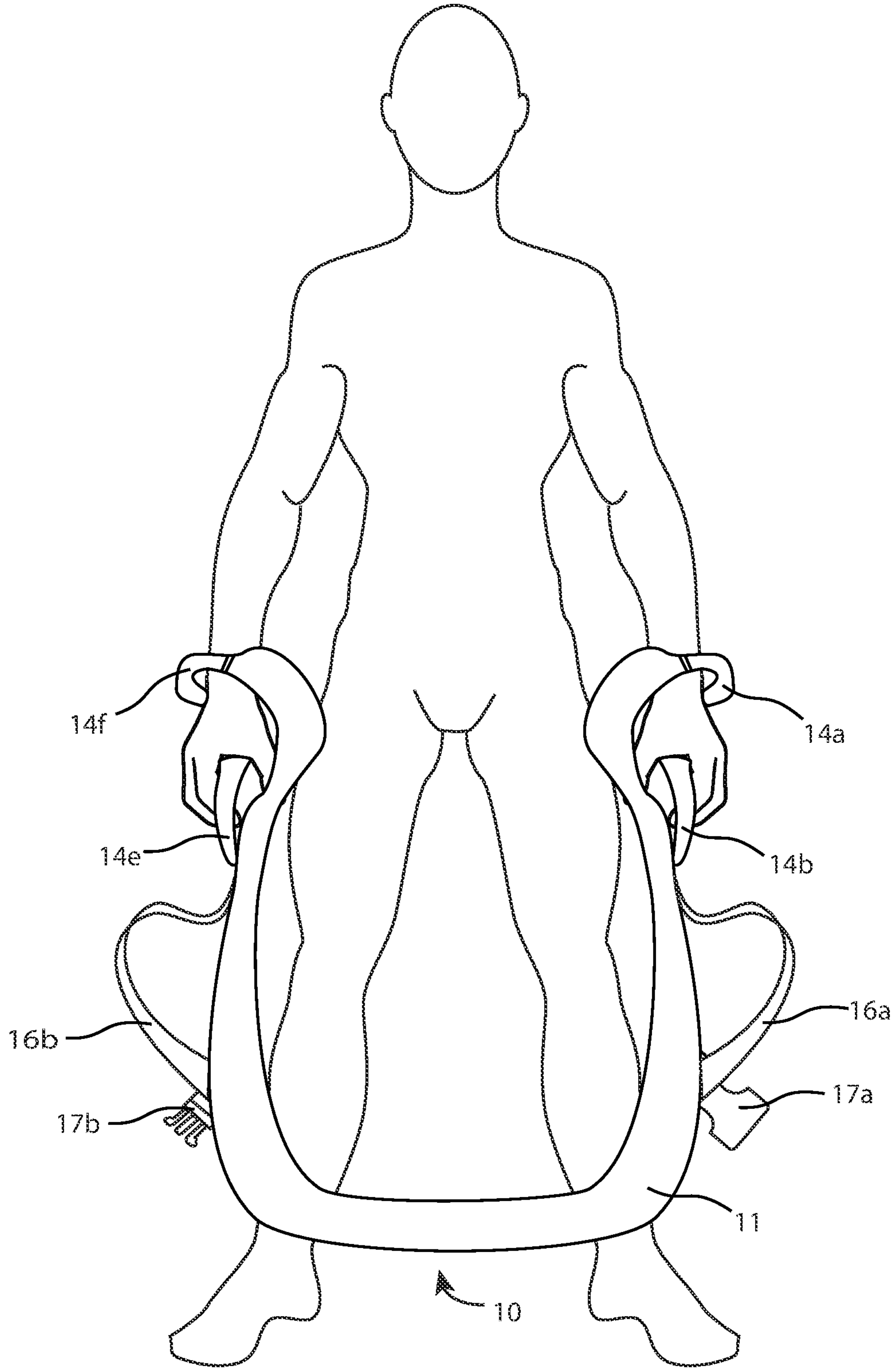
FIG. 9 illustrates use of a gait belt as a lifting sling according to an alternative embodiment of the present invention.

In another embodiment, a modified lifting sling configuration of gait belt 10 is disclosed. This configuration is illustrated in FIG. 9. Similar to the alternative lift sling configuration mentioned in the previous embodiment, the elongated belt body 11 with its handles either facing upwards or downwards, is placed underneath the thighs of the patient, preferably close to the buttocks such that the central handle 15b (not shown) gets positioned betwixt the patient's thighs. Multiple handles provided around the circumference the elongated belt body 11 allow for a choice of grip heights for the care provider to select from to maximize lifting form and safety. To lift the patient to standing position, two or more care providers can grab the handles provided thereon the gait belt 10 to perform a lift maneuver by applying an upward lifting force in a forward arcing motion. Optionally, the care providers may choose to simply clasp the belt strap extension buckles 18a and 18b together in front of patient's pelvic region, to form an appropriately tightened closed circular enclosure of belt strap extensions only and perform the lift maneuver. The care providers can always choose a handle which will be the most appropriate one to perform the lift maneuver in a successful manner. This feature provides a significant reduction of risk for back injuries to care providers. Preferably, this maneuver should be performed by at least two care providers and each care provider should pass his/her forearm at least through one of the perpendicular handles and then grab the next perpendicular handle with his/her hand to ensure a safe and a smooth lift maneuver.

While the present invention has been described above with reference to various exemplary embodiments, many changes, combinations and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A gait belt for lifting a patient about the waist, comprising:

a) a belt body having a central axis, a generally elongated configuration, and two opposed free end portions, the belt body configured to at least partially encircle the patient's waist;

b) a primary belt strap connected to the belt body, is configured to adjustably secure the belt body in relation to the patient's waist;

c) first and second belt strap extensions extending from the primary belt strap and configured to thread under the legs of the patient and through handles positioned at the two opposed free end portions of the belt such that the first and second belt strap extensions serve as adjustable leg straps; and, d) a plurality of lifting handles affixed in varying rotational orientations along the belt body in circumferentially spaced relation to one another for use in grabbing with different rotational grip orientations, including one handle positioned at each end of the belt body and sized and oriented to form a girth loop or "girth hitch" at one end of the belt body by passage of a distal end of the belt body through one of the handles positioned at the other end of the belt body such that the girth hitch may be positioned about the hips, waist or chest of a user as a drag assist device;

wherein different positional combinations of the primary belt strap and first and second belt strap extensions configurable to form each of a smaller belt body loop, a larger belt body loop, and leg supports.

2. The gait belt of claim 1, wherein the first and second belt strap extensions serve both as thigh supports and as the closure to secure the belt body about the patient's waist.

3. The gait belt of claim 1, further comprising at least one wrist loop affixed to one of the free end portions of the belt body, and configured for lifting.

4. The gait belt of claim 1, wherein the primary belt strap further comprises adjustable securing closure mechanisms comprising at least one of the fasteners selected from the group of buckles, latches, hooks, loops, snaps, adhesives, cohesives, magnets, hermaphroditic fasteners, touch fasteners, interlocking projections and receptacles fasteners, or any combination thereof.

5. A gait belt for lifting a patient about the waist, comprising:

a) a belt body having a central axis, a generally elongated configuration, and two opposed free end portions, the belt body configured to at least partially encircle the patient's waist;

b) a belt strap connected to the belt body having two opposed distal ends, configured to adjustably secure the belt body in relation to the patient's waist with complementary halves of a closure;

c) a perimeter webbing provided along the circumference of the belt body;

d) a vertical webbing provided at each distal end of the belt strap; wherein the said belt strap is configured to only cover a portion of the said belt body; and e) a plurality of lifting handles affixed in varying rotational orientations along the belt body in circumferentially spaced relation to one another for use in grabbing with different rotational grip orientations, and including a handle positioned at one end of the belt body and being sized and configured to receive the belt body therethrough to form a girth loop in the belt body to serve as a drag assist device positionable about the waist, hips, or chest of a user;

wherein the opposed distal ends are configured to thread under the legs of the patient and through handles positioned at the two opposed free end portions of the belt such that each distal end of the belt strap serve as adjustable leg straps.

6. The gait belt of claim 5, further comprising first and second belt strap extensions with closure halves complementary to the respective closure halves of the said belt strap for use in forming leg straps attached to said belt strap.

7. The gait belt of claim 5, wherein combinations of the closures of the belt strap and belt strap extensions are configurable to form a smaller belt body loop, a larger belt body loop, and leg supports.

8. The gait belt of claim 7, wherein the belt strap extensions serve both as thigh supports and as the closure to secure the belt body about the patient's waist.

9. The gait belt of claim 5, wherein the belt strap adjustably securing closure mechanism comprising at least one of the fasteners selected from the group of buckles, latches, hooks, loops, snaps, adhesives, cohesives, magnets, hermaphroditic fasteners, touch fasteners, interlocking projections and receptacles fasteners, or any combination thereof.

10. A gait belt for lifting a patient, comprising:

a) a belt body having a central axis, a generally elongated configuration, and two opposed free end portions, the belt body configured to at least partially encircle the patient's waist;

b) a single continuous piece of flexible material affixed to the belt body forming an elongate closed loop over itself having two opposed distal ends, an elongate top segment and an elongate bottom segment;

wherein the single continuous piece of flexible material forming the closed loop is configured to form a belt strap sewn over a portion of said belt body, and sewn to form a plurality of handles positioned in varying rotational orientations along the belt body in circumferentially spaced relation to one another for use in grabbing with different rotational grip orientations, including at a handle positioned at one end of the belt body and being sized to receive the belt body therethrough to form a large belt body loop to serve as a drag assist device positionable about the waist, hips or chest of a user, and a pair of first and second belt strap extensions having said opposed distal ends, extending beyond the length of the said belt body and configured to thread under the legs of the patient and through handles positioned at the two opposed free end portions of the belt such that the first and second belt strap extensions to form leg straps attached to said belt body.

11. The gait belt of claim 10, further comprising complementary halves of a closure, wherein each halve of the closure is provided at the said opposed distal ends of the belt strap extension, configured to adjustably secure the belt body in relation to the patient's waist, hips or torso.

12. The gait belt of claim 10, further comprising complementary halves of a closure, wherein each halve of the closure is provided over the length of the said belt body in spaced apart relation, configured to adjustably secure the belt body in relation to the patient's waist.

13. The gait belt of claim 10, wherein combinations of the closures provided over the length of the belt body and the closures provided on the belt strap extensions are configurable to form a smaller belt body loop, a larger belt body loop, and leg supports.

14. The gait belt of claim 11, wherein the belt strap extensions serve both as thigh supports and as the closure to secure the belt body about the patient's waist.

15. The gait belt of claim 11, wherein combinations of the closures provided over the length of the belt body and the closures provided on the belt strap extensions are configurable to form a smaller belt body loop, a larger belt body loop, and leg supports.

16. The gait belt of claim 15 wherein a plurality of lifting handles are positioned at multiple grasping heights.

17. The gait belt of claim 15 wherein the belt strap extensions are laced over the patient's thighs and fastened together to adjustably secure the sling to the patient.

18. The gait belt of claim 15 wherein the belt strap extensions are laced around the thighs of the patient and through one or more handles to fashion/form a harness to adjustably secure the lifting sling to the patient.

19. The gait belt device of claim 15, wherein the belt strap extension can be laced around a handle of the opposing side of the belt to form an adjustable girth hitch.

* * * * *